Figure 1:
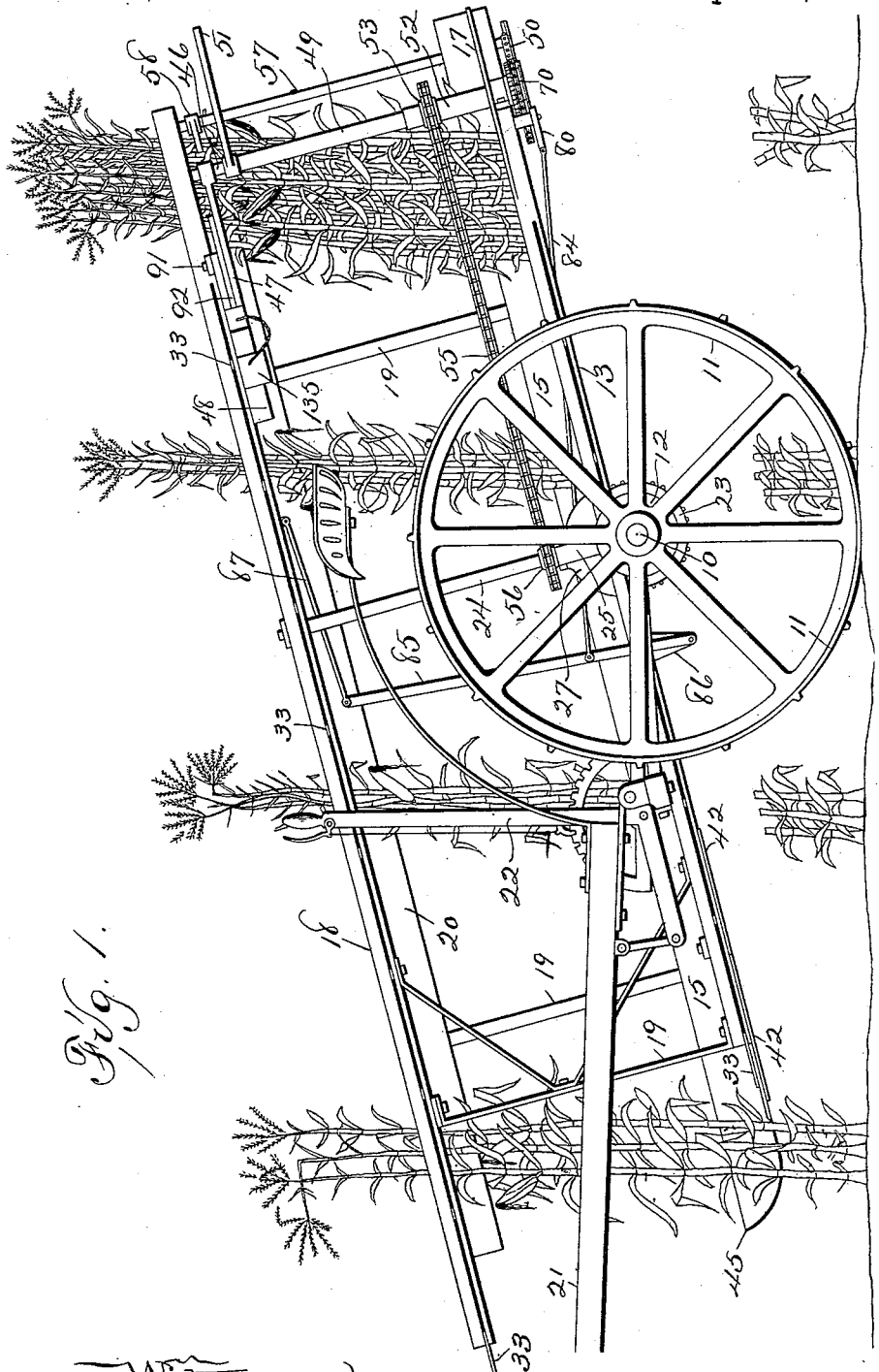

(No Model.) 9 Sheets—Sheet 1.

W. H. GRAY.
CORN HARVESTER AND BINDER.

No. 602,659. Patented Apr. 19, 1898.

Witnesses: W. J. Tankey, J. A. Bramhall

Inventor: William H. Gray, By Thomas G. and J. Ralph Orwig, Attorneys.

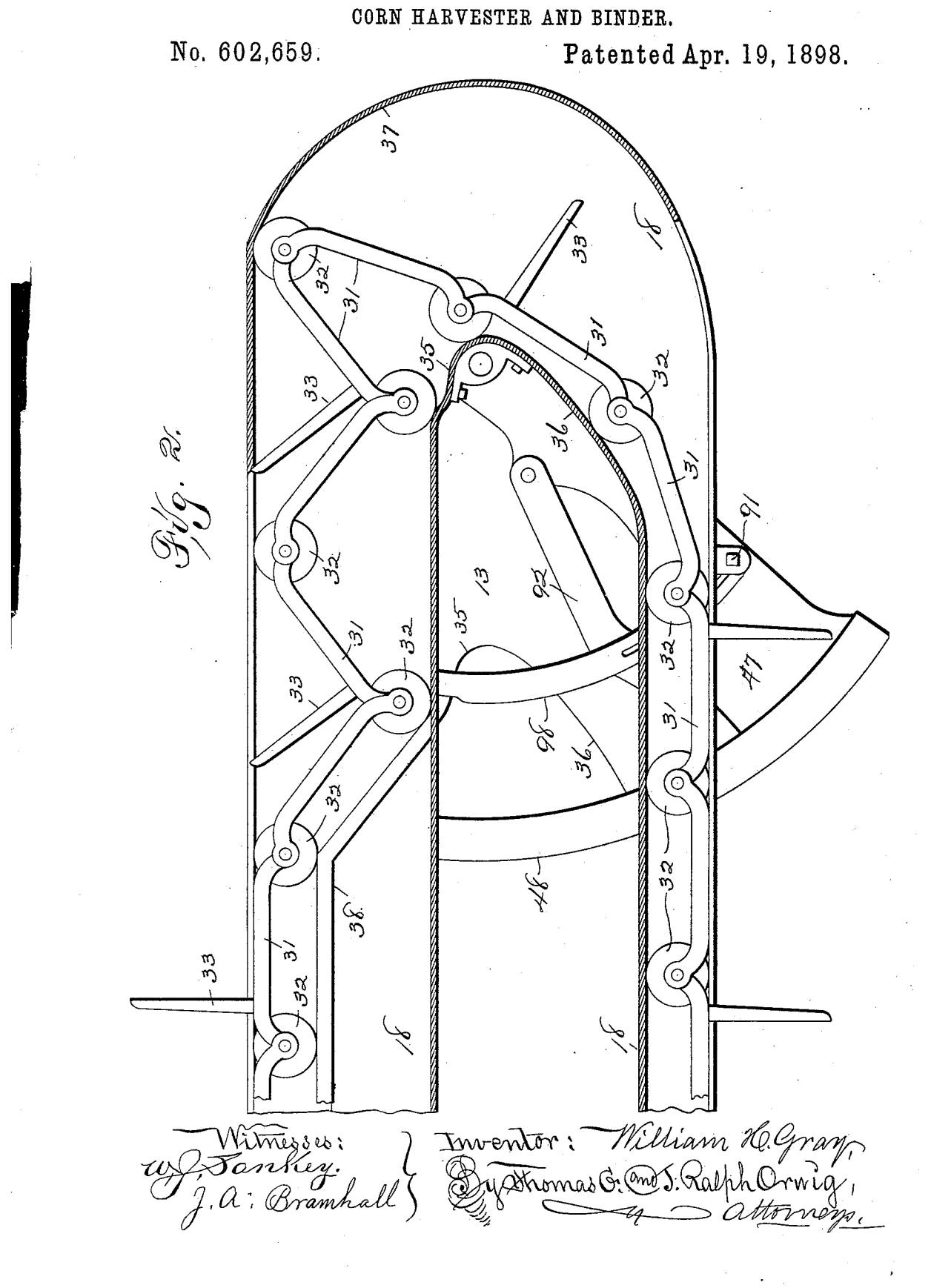

(No Model.) 9 Sheets—Sheet 2.

W. H. GRAY.
CORN HARVESTER AND BINDER.

No. 602,659. Patented Apr. 19, 1898.

Fig. 2.

Witnesses:
W. J. Sankey.
J. A. Bramhall

Inventor: William H. Gray,
By Thomas G. and J. Ralph Orwig,
Attorneys.

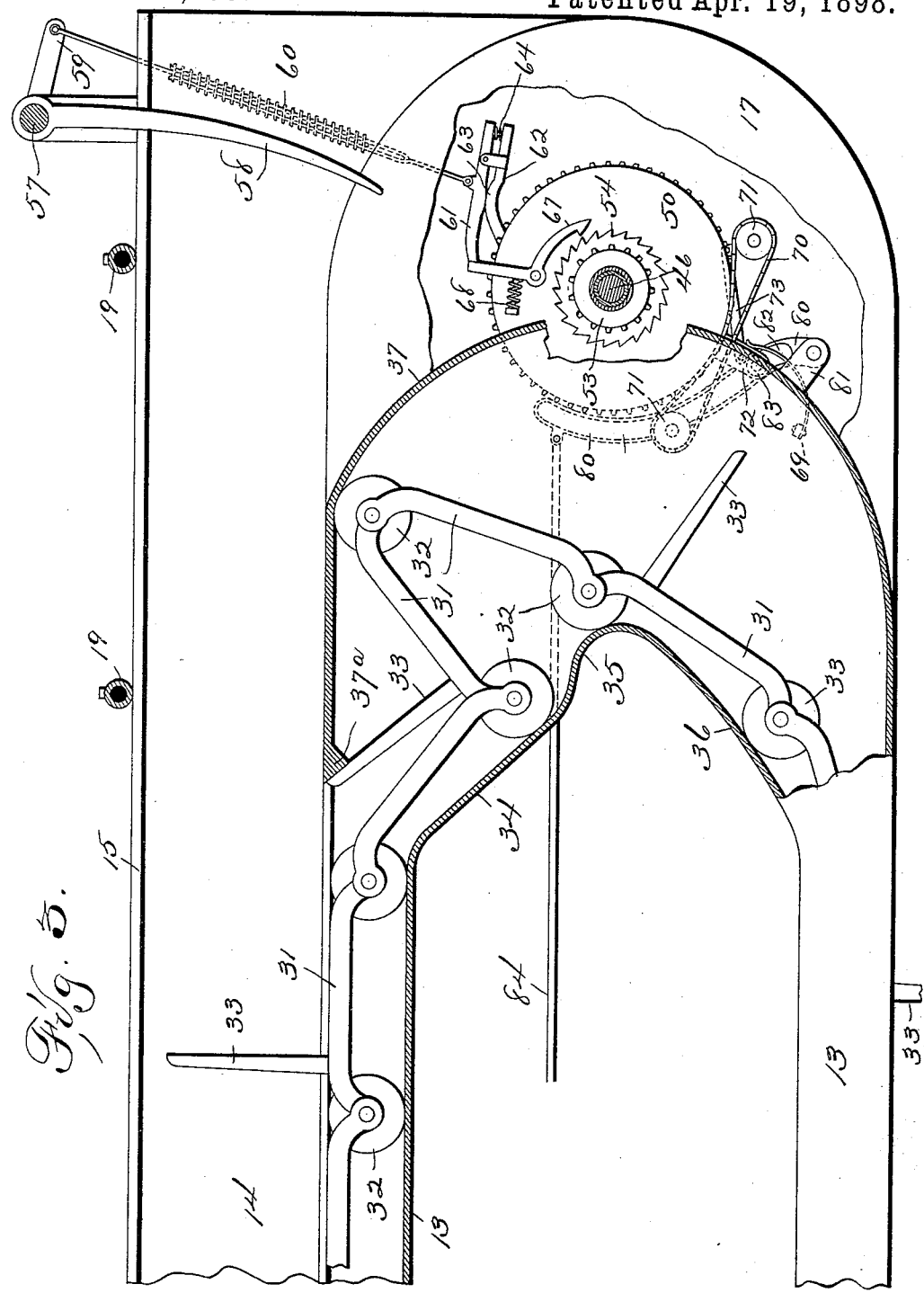

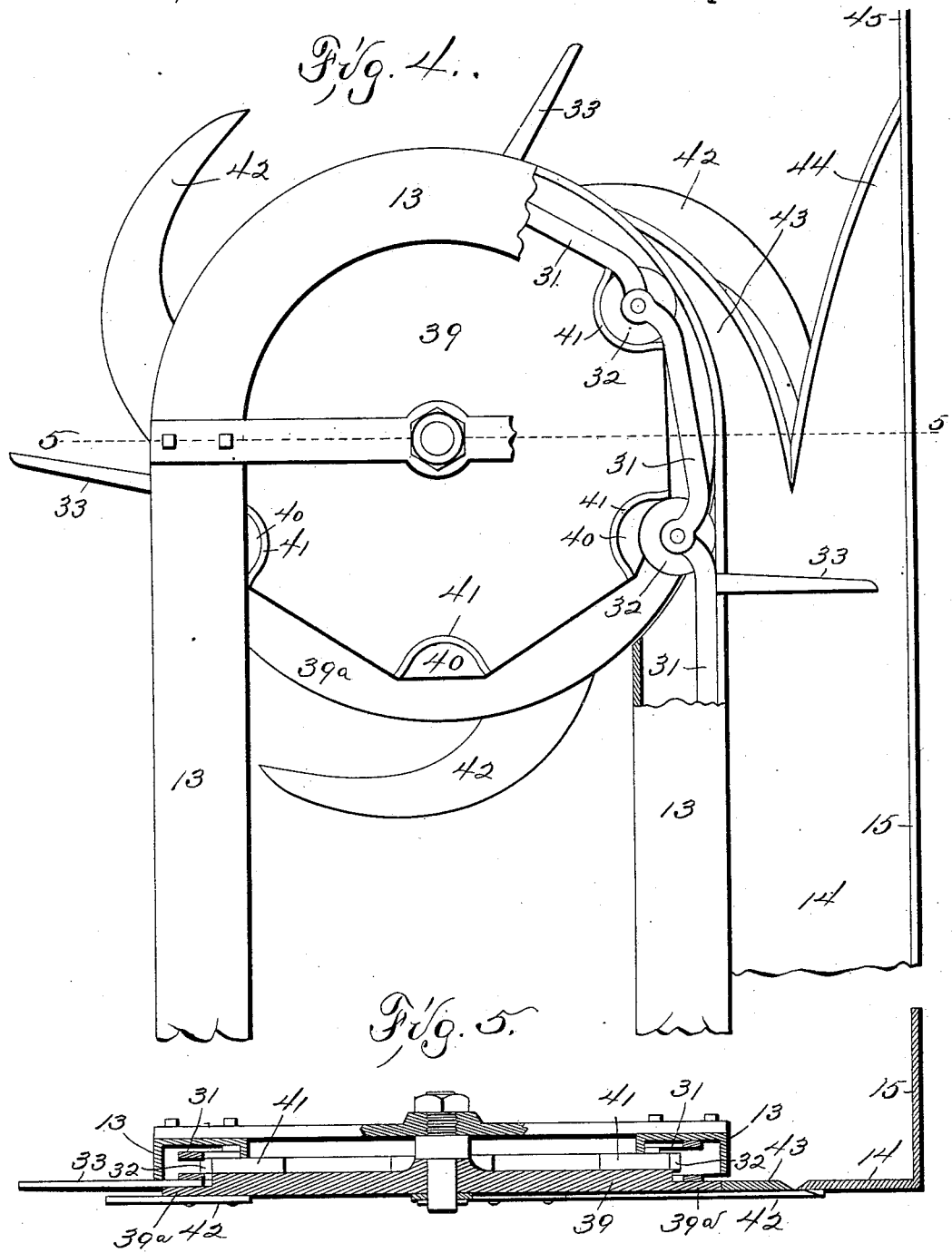

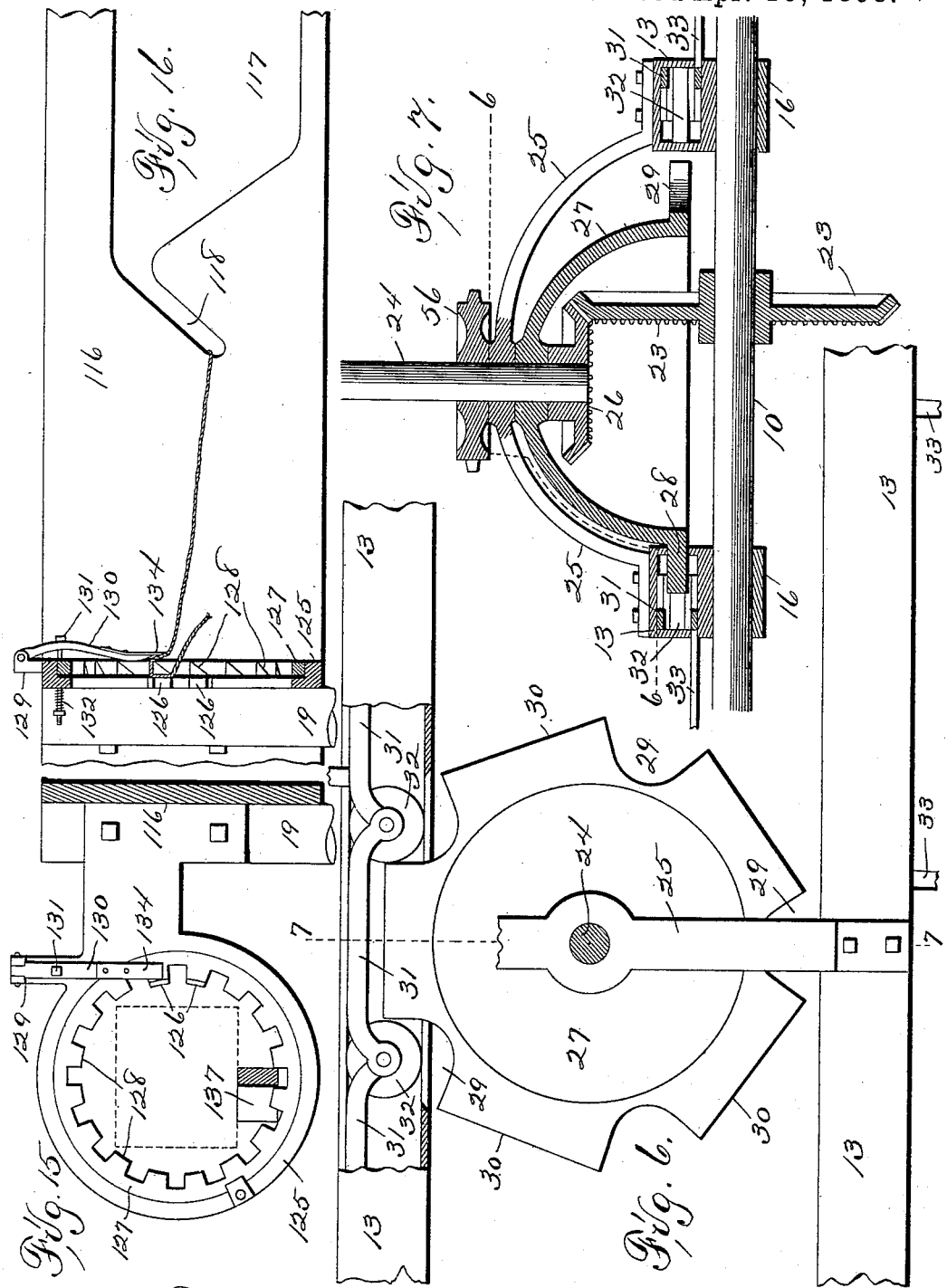

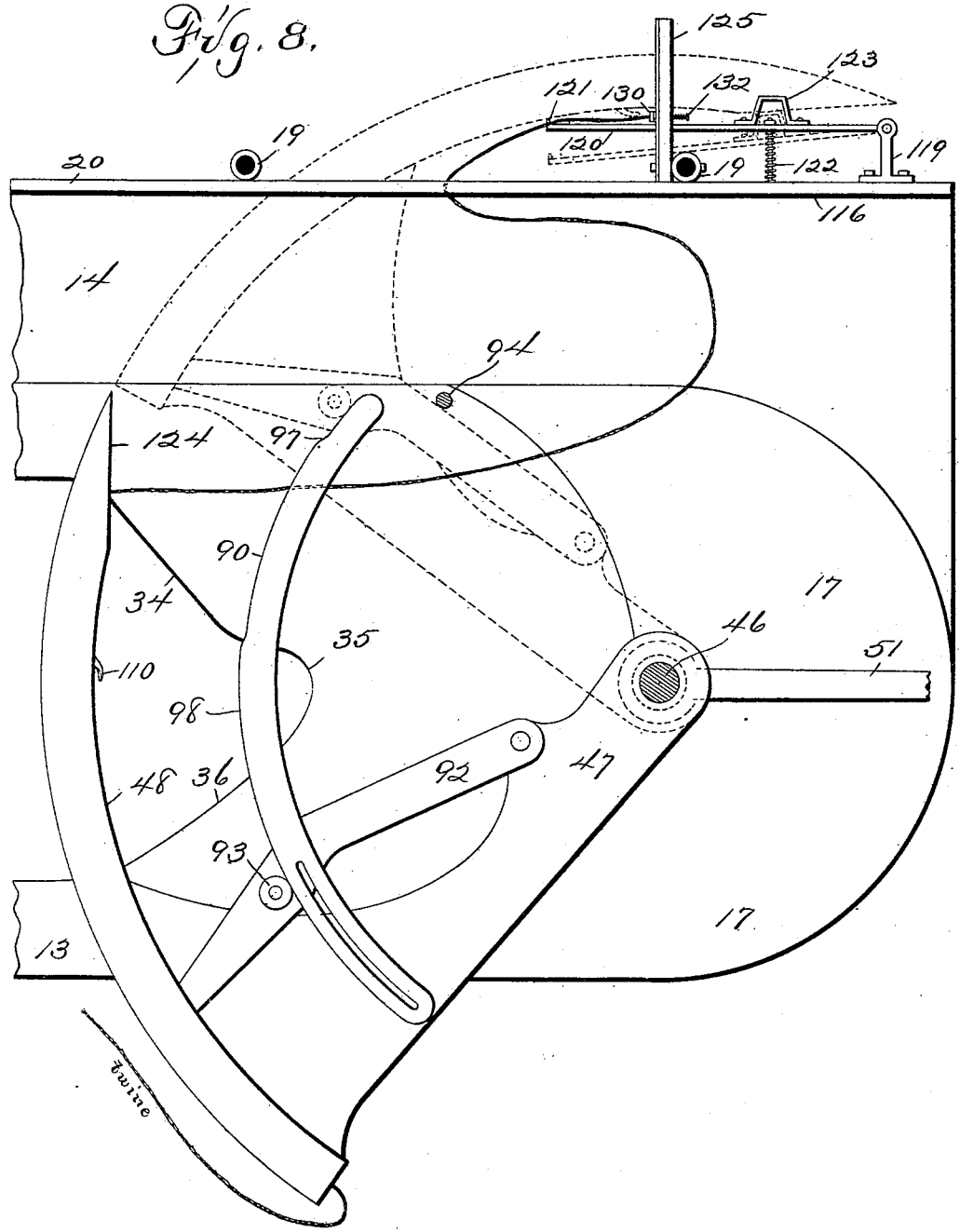

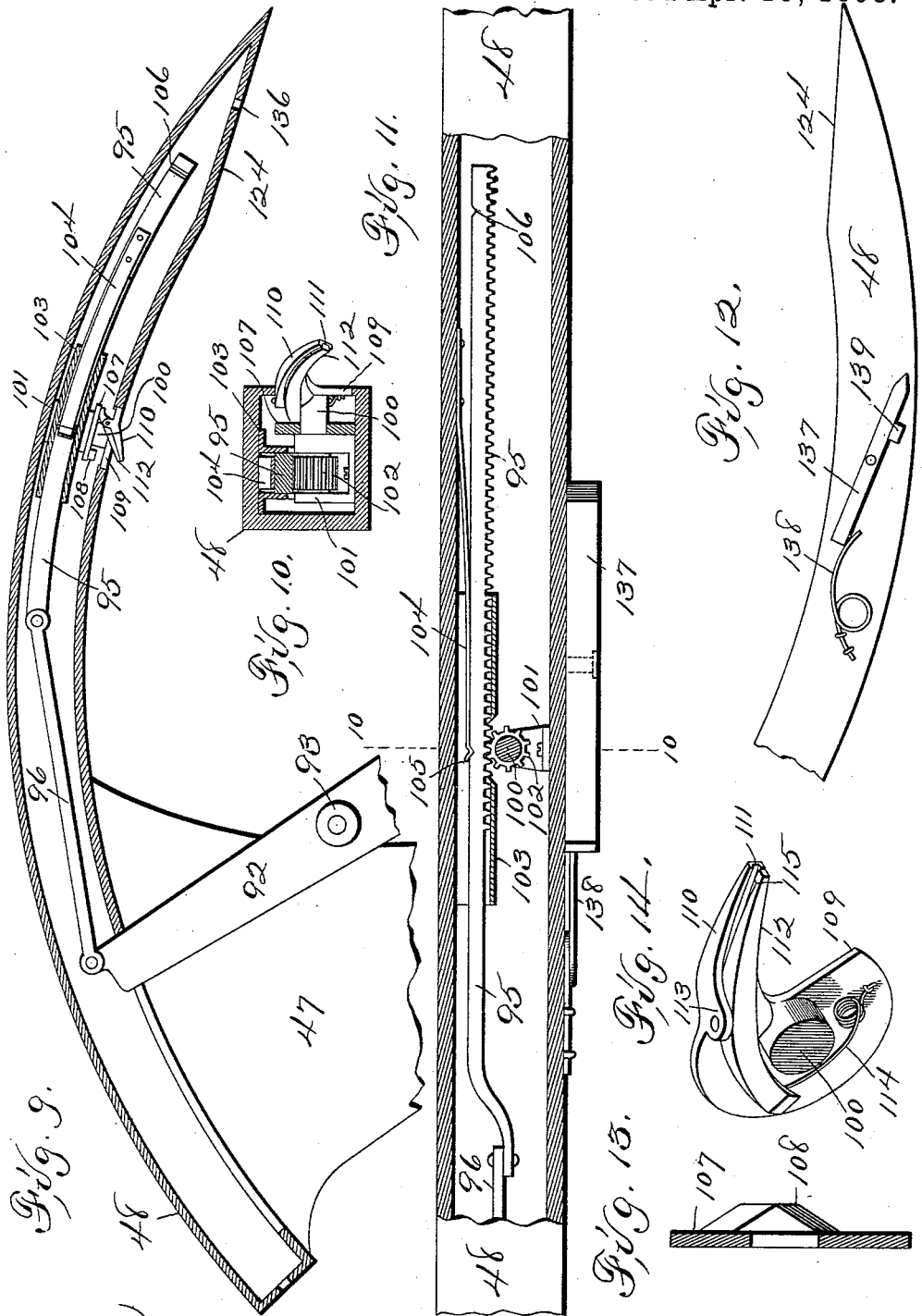

(No Model.) 9 Sheets—Sheet 8.
W. H. GRAY.
CORN HARVESTER AND BINDER.
No. 602,659. Patented Apr. 19, 1898.
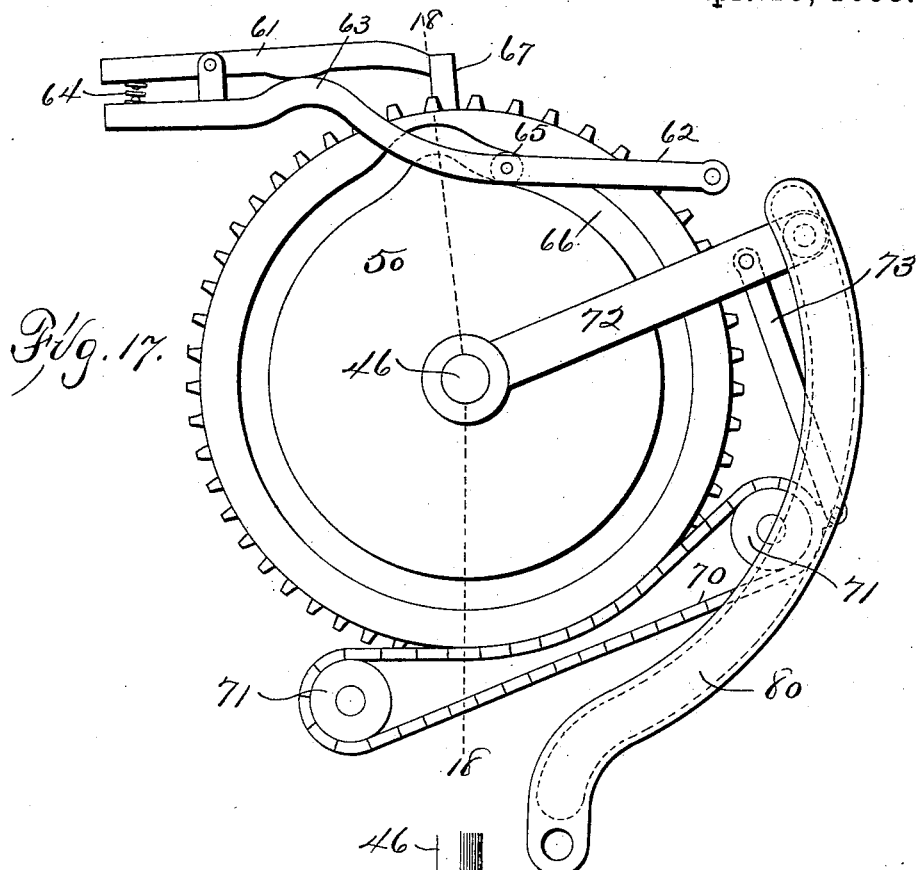
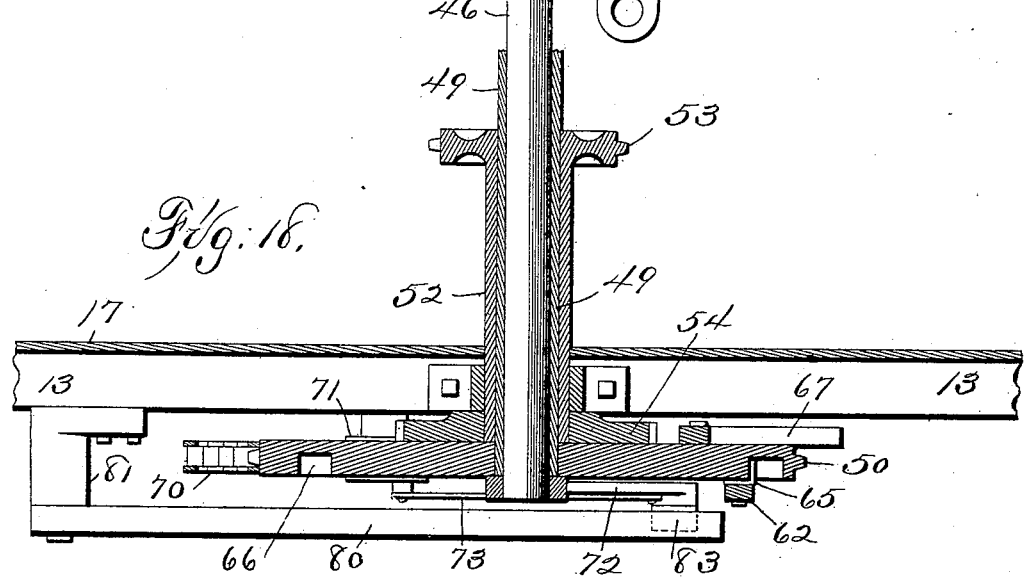

(No Model.) 9 Sheets—Sheet 9.

W. H. GRAY.
CORN HARVESTER AND BINDER.

No. 602,659. Patented Apr. 19, 1898.

UNITED STATES PATENT OFFICE.

WILLIAM HENRY GRAY, OF EDDYVILLE, IOWA.

CORN HARVESTER AND BINDER.

SPECIFICATION forming part of Letters Patent No. 602,659, dated April 19, 1898.

Application filed March 22, 1897. Serial No. 628,563. (No model.)

*To all whom it may concern:*

Be it known that I, WILLIAM HENRY GRAY, a citizen of the United States, residing at Eddyville, in the county of Wapello and State of Iowa, have invented a new and useful Corn Harvester and Binder, of which the following is a specification.

The object of this invention is to provide a corn harvester and binder of inexpensive construction and of comparatively few parts, each of which is of simple, strong, and durable construction, and to provide a machine of this class in which all of the operations of cutting, binding, and discharging are automatic and which are accomplished without stopping the machine at any point and with a minimum of applied tractional power.

A further object is to provide a corn harvester and binder in which the shocks of corn are bound while standing in a vertical position on an inclined platform, to thereby produce a shock having the butt-ends of the stalks arranged at an incline, so that a number of shocks may be placed together in an upright position in the field and the butt-ends of the shocks be made to stand flat on the ground surface, because the necessarily-inclined position of the shocks to support each other will cause the butt-ends of the separate shocks to stand flat on the ground surface. This will obviously cause them to stand more securely in a field than would be possible with square-butted shocks.

A further object is to provide means in a corn-harvester in which the shock is tied when standing in a vertical position on an inclined shock-forming platform, whereby the binder-twine may be passed around the shocks in a horizontal plane, so that it may encircle the smallest diameter of the shock, to thereby bind the same securely and tightly; and in this connection it is a further object to accomplish this desideratum with simple, strong, durable, and inexpensive mechanisms that may be operated by a minimum of applied power.

A further object is to provide a machine of this class in which only one set of conveyers is necessary to carry the cornstalks in an upright position to the shock-forming platform.

A further object is to provide a conveyer that may be operated with a minimum of applied power and in which the conveyer-arms are withdrawn by positively-operated means from contact with the cornstalks when the same have been carried to the shock-forming platform and in such a manner as to preclude the possibility of the stalks becoming entangled in the arms.

A further object is to provide a device of simple, strong, and durable construction arranged to be driven by the conveyers and designed to cut the cornstalks.

A further object is to provide improved and simplified means for automatically holding or retaining the upper ends of the stalks from passing to the shock-former during that period of time in which the binding and discharging mechanisms perform their functions and for again passing the stalks to the shock-former after the binder-needle and the discharge-arm have been returned to their normal positions, and, further, in this connection to provide simple, strong, durable, and positively-operated means whereby the binding-needle and discharge-arm are made to perform their movements at the proper moment of time relative to the said stalk holding or retaining mechanism.

A further object is to provide automatic binding and knotting mechanism of improved and simplified construction.

My invention consists, essentially, in the construction, arrangement, and combination of the various parts of the machine, whereby the objects contemplated are attained, as hereinafter set forth, pointed out in my claims, and illustrated in the accompanying drawings, in which—

Figure 1 shows a side elevation of the complete machine with a shock of corn therein. Fig. 2 is a detail showing the rear end of the upper track in horizontal section to illustrate the arrangement of the conveyer-chain and the slide therein. Fig. 3 shows a detail of the rear end of the lower track with the hollow track in horizontal section to show the arrangement therein of the conveying-chain and also showing the mechanism which is set in motion by an accumulation of stalks upon the shock-forming device and which is designed to operate the binding-needle, the slide in the upper track, and the discharge-arm.

Figure 20:
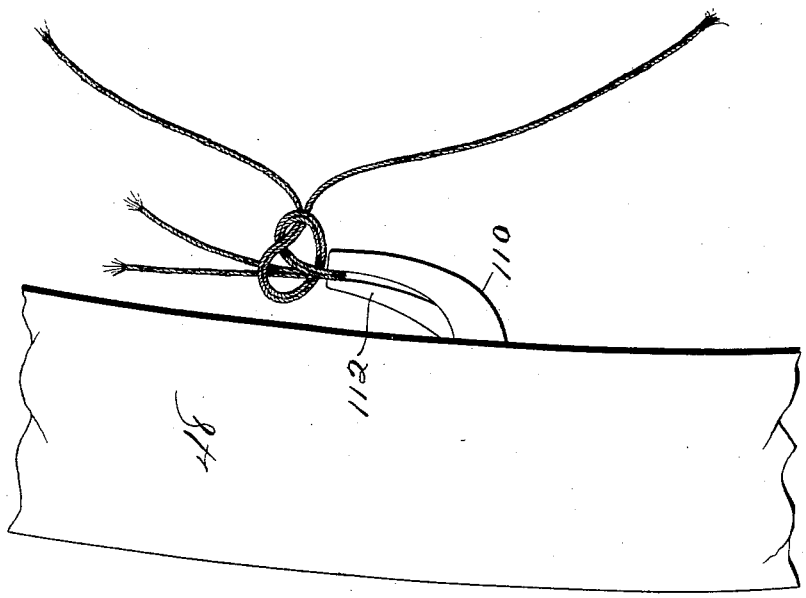
Figure 19:
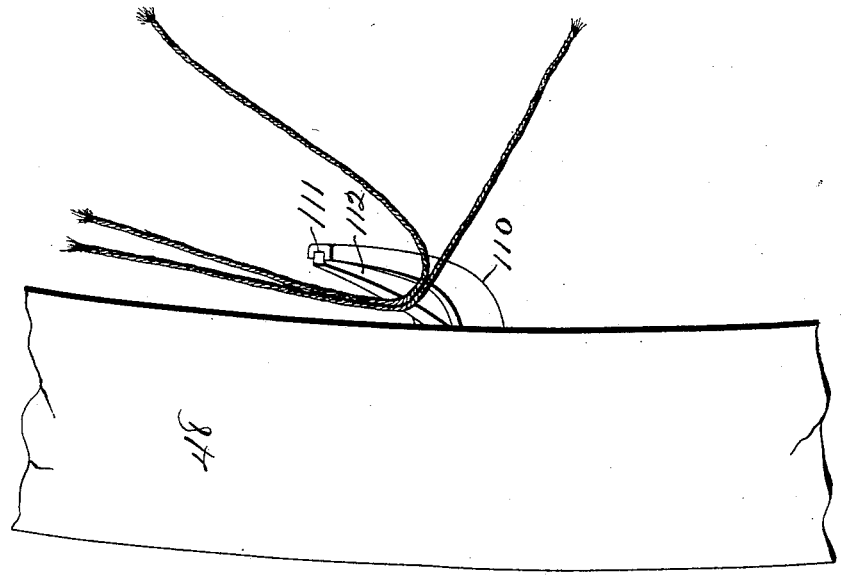

Fig. 4 shows a detail illustrating the forward end of the lower track to show the arrangement and combination therewith of the corn-cutting device and the means for driving the same from the endless conveyer. Fig. 5 shows a vertical transverse sectional view through the line 5 5 of Fig. 4. Fig. 6 shows a detail view in horizontal section through the line 6 6 of Fig. 7. Fig. 7 shows a vertical transverse sectional view through the line 7 7 of Fig. 6. Fig. 8 shows a detail plan view of the binding-needle and accompanying parts. The dotted lines therein show the binding-needle at one limit of its movement and the solid lines at its other limit. Fig. 9 shows a detail view, in horizontal section, of the binding-needle and the knotting mechanism contained therein. Fig. 10 shows a detail view, in transverse section, of the binding-needle, taken at a point adjacent to the knotting mechanism therein through line 10 10 of Fig. 11. Fig. 11 shows a detail view, in vertical longitudinal section, of a portion of the binding-needle to illustrate the means for rotating the shaft upon which the knotter is located. Fig. 12 shows the under side of the outer end of the binding-needle. Fig. 13 shows an end elevation of a cam device for operating the movable finger of the knotter. Fig. 14 shows a perspective view of the inner surface of the knotter. Fig. 15 is a front elevation of the device for holding the ends of the twine and for severing the twine after the knot has been made. Fig. 16 shows a side elevation of the same with a piece of twine in position therein. Fig. 17 shows an inverted plan view of part of the mechanism for transmitting motion to the binder-needle and the discharge-arm. Fig. 18 shows a vertical sectional view of the same mechanism. Fig. 19 shows a top or plan view to illustrate the general arrangement of the parts of the binding mechanism when the knotter is in position for engaging with the ends of the loop that encircles the shock. Fig. 20 is a similar view showing the knotting mechanism in its last position—that is, ready to complete the knot.

This machine belongs to that class of corn-harvesters in which the cornstalks are severed as the machine is advancing, the stalks carried in a vertical position to a platform at the rear end of the machine by means of power derived from the traction-wheels, and the stalks then tied into a shock automatically.

The frame of the machine comprises an axle 10, having wheels 11, rotatably mounted on its ends and provided with internal ratchet devices 12, so arranged that the wheels may rotate backwardly relative to the axle, but not forwardly.

The reference-numeral 13 indicates a lower track. This track is preferably cast in one piece and is provided with a laterally-projecting flange 14 on one side, and on the outer edge of this flange is an upturned guide 15.

A bearing 16 is also cast integral with the track 13, and the axle 10 is mounted in the said bearing. At the rear end of the part 13 is a rearwardly-projecting platform 17, designed to cover certain mechanism hereinafter described and in connection with flange 14 serves as the binding-platform.

The numeral 18 indicates the upper track. It is arranged to extend in the same plane as the lower track and a considerable distance in advance thereof and also as far as or farther rearwardly than the lower track. It is supported from the lower track by means of braces 19.

Each track is provided with a slot at the central portion of its outer edge through which the fingers carried by the chain may project to engage the stalks of corn. The interior of the track is substantially rectangular in shape, and the sides thereof are designed to be engaged by the rollers carried by the endless conveyer-chain.

20 indicates a guide-rail supported by the braces 19 or in any suitable way to extend parallel with the upper track and directly over the upturned edge 15. This rail 20 serves as a guide for the top portions of the stalks, and the edge 15 holds the lower ends of the stalks in position.

21 indicates a tongue pivoted to the machine-frame and to the axle 10, and 22 indicates a lever fulcrumed to the machine-frame and connected with the tongue to provide means whereby the forward end of the machine-frame may be raised relative to the ground surface.

The reference-numeral 23 indicates a bevel gear-wheel keyed to the shaft 10.

24 indicates a shaft rotatably mounted in a bearing 25, fixed to the lower-track section, and also mounted in a suitable bearing in the upper-track section. On its lower end is a bevel gear-wheel 26, keyed thereto and in mesh with the wheel 23, and 27 indicates a wheel bowed upwardly in its central portion fixed to the shaft 24 above the wheel 23 and having its lower edge extended horizontally at 28. The outer edge of the part 28 is provided with a series of pockets 29 and straight portions 30, which are shaped to engage the links of the endless conveyer hereinafter described. By this peculiar shape of the wheel 27 the wheels 23 and 26 may operate within the wheel 27. On the upper end of the shaft 24 is a wheel similar to the wheel 27, except that it is flat. It is obvious that inasmuch as the endless conveyers engage the wheels 28 and their counterparts in the upper track when the axle 10 is rotated by the advance of the wheel both of said conveyers will be advanced in their respective tracks.

The conveyers proper are composed of a series of links. Each link is provided with two longitudinal parts 31, straight in their central portions and bent at their ends, and a roller 32, mounted between the ends of the said parts. Each alternate link is provided with an arm 33 of such a length as to extend from the link across the space between the track and the guides to a point near the guides. Each of these rollers 32 is of such a diameter as to almost fill the interior of the track. Thus the arms 33 are always held in a position at right angles to the track, except at the widened part of the track, and the pressure of the stalks upon the said arms 33 is prevented from causing a great friction against the inner edge of the track by reason of these rollers 32. I have provided means whereby these arms 33 are withdrawn from engagement with the cornstalks when the cornstalks have advanced to the shock-forming platform and to cause them to withdraw in such a manner that the cornstalks cannot become entangled therewith or compressed against the tracks thereby. At the point in the lower track where it is desired to cause these arms to withdraw I have inclined the inner edge of the track inwardly at 34 at a comparatively sharp angle. At the rear end of this incline 34 is an inwardly-projecting curved portion 35. This inner edge of the track is then inclined outwardly at any desirable angle at 36 until it enters the straight track portion at the opposite side of the track. The outer edge of the track is round at its rear end, and this round portion 37 is separated from the parts 34 and 35, so that the entire link may enter the track and one of the rollers 32 engage the parts 34 and 35, while the other roller is extended radially therefrom to engage the part 37. The conveyer-chain is of a length somewhat greater than the distance around the track, and hence it is necessary that the links kink or fold at some point. This widened portion of the track gives room for the links to fold. They are forced, not drawn, into said widened portion. Hence they will kink or fold there. In practical operation there is usually a pressure caused by the weight of the cornstalks on the arm 33, and it is obvious that when the inner edge of the track permits the roller 32 to pass inwardly the weight of the stalks on the arm 33 will cause the roller 32 to travel along the inner edge of the track at 34. This will withdraw the arm 33 into the interior of the track. However, the links cannot fill the inner edge of the track on account of the excessive length of the chain, and hence the links that bear the arms 33 will extend outwardly, so that one roller thereof will rest upon the round portion 35, while the other engages the outer edge of the track. Then as the conveyer-chain is further advanced around the track the links will again straighten out and travel through the opposite side of the track in the same manner as through the other straight portion of the track. The curved portion 35 serves to cause the links to straighten out at the proper point. I have provided a device 37ª, formed on or fixed to the interior of the track to engage the rounded end of the lower portion of the links to thereby start the proper link to fold. This device 37ª is, when the conveyer is in active operation, unnecessary. However, when there is no corn being carried by the arms it is often useful in causing the arms to kink or fold at the proper point.

The upper track is constructed in substantially the same manner as the lower track and extends as far or farther rearwardly than the lower track. Hence the tops of the stalks will be carried as far as the butts and the shock will be formed in a vertical position on the inclined platform. The upper track is widened for a considerable space near its rear end, so that the links may kink or fold at any point along this widened portion. Within this said widened portion I have placed a slide 38 to be substituted for or to take the place of the incline 34. I have provided means for moving this slide 38 longitudinally in the track at a certain time, so that the links will kink or fold in different positions relative to the shock-forming platform, which mechanism will be described hereinafter.

At the forward end of the lower-track section I have provided a wheel 39, arranged concentrically within the forward turn of the track and rotatably mounted. At its bottom is an outwardly-projecting circular flange 39ª to serve as a support for the chain. It is located in the same plane as the bottom of the track, which is cut away where the flange is substituted therefor. Formed on the top surface of the wheel 39 is a series of pockets 40, formed by the curved raised rims 41. These pockets are of a size and shape to engage the rollers on the conveyer, and the wheel is so arranged relative to the track that the rollers will enter the said pockets, and thereby rotate the wheel 39.

The rotary knives (indicated by the reference-numeral 42) are fixed to the disk 39 and are of peculiar shape, which is essential to their successful operation. Each blade is projected forwardly with relation to its line of advance, so that between its cutting edge and the edge of the disk a V-shaped space is formed. Said cutting edge is also curved from a radial toward a tangential line with reference to the disk. The stationary blade (indicated by the reference-numeral 43) is also curved and diverges from a fore-and-aft line in a direction toward the disk. It is also arranged eccentrically of the disk, the distance of separation therefrom increasing toward the rear end of the blade, and the said blade is curved outwardly from the disk.

44 indicates a stationary blade projecting from the rear end of the stationary blade 43 forwardly and in a direction from the disk.

In use the peculiar curvature of the blades and their relative positions causes a stalk placed between the blades to be severed by a drawing cut, which is made effective on both sides of the stalk. In use it frequently occurs that the stationary knife 43 will engage and partially sever a stalk with a drawing cut before the rotary blade comes into a position of engagement with the stalk.

It has been observed in practical use that after a stalk has been engaged between the blades and upon a further advance of the rotary blade the cutting edge of the rotary blade was drawn along the stalk and cut into it and by reason of the narrow V-shaped opening between the blades the stalk was rolled or drawn against the edge of the stationary blade, and hence cut on that side. By reason of the fact that the angle between the blades constantly decreases during the advance of the rotary blade the length of this "drawing" movement of the blades increases constantly as the rotary blade approaches the stationary one. Furthermore, the stationary blade 44 serves to sever some of the stalks and directs the others toward the mating stationary blade 43. This blade 44 coacts with the rotary blade in that it will positively prevent the escape of a stalk from between the blades. The said rotary blade crosses the cutting edge of the fixed blade, its base coming first and its point gradually approaching the said fixed blade, and an object between the blades will be severed with a drawing cut of the stationary blade from its front toward its rear end and a drawing cut of the rotary blade from its point in the direction of its base. The said blade 43 is so positioned that its sharpened edge will engage and sever a large portion of the cornstalks without the coöperation of the rotary knife. However, the rotary knife serves to cut such stalks as are not readily severed by the fixed knife, and it also keeps the cutting edge of the fixed knife clean, and inasmuch as the major number of the stalks are severed by a drawing cut of the fixed knife the operation of cutting cornstalks requires much less power than would be needed were all of the stalks severed by a shear cut.

From the foregoing description it will be noted that the corn may be directed to the cutting devices and the stalks severed and carried in an upright position to the rear of the machine, where they are supported in an upright position for binding. It is obvious, further, that this is accomplished with a comparatively few parts and with minimum of applied power.

The mechanism for operating the stalk-supporting arm, the binding-needle, and the discharge-arm are all connected and interdependent and are set in motion conjointly. Hence I shall first describe this mechanism for operating these devices and later a detailed description of each device separately considered.

The reference-numeral 46 indicates a shaft rotatably mounted at right angles to the tracks in suitable bearings in extensions formed on the upper and lower tracks. On the top of this shaft 46 the arm 47 is fixed to extend in the same plane as the tracks, and on the outer end of this arm is the binding-needle 48.

The reference-numeral 49 is used to indicate a sleeve rotatably mounted on the shaft 46 and having at its top a discharge-arm normally extended rearwardly—that is, in a direction opposite from the position of the arm 47, and on its lower end is fixed a sprocket-wheel 50. The said discharge-arm (indicated by the reference-numeral 51) is preferably straight and of a length to project over the binding-platform, so that a rotation of the discharge-arm will force the shock on the shock-forming platform rearwardly to discharge it from the machine.

The reference-numeral 52 indicates a second sleeve, rotatably mounted on the lower end of the sleeve 49 and having fixed to its top a sprocket-wheel 53 and fixed to its bottom a ratchet-wheel 54.

55 indicates a sprocket-chain passed around the wheel 53 and also around the wheel 56, which in turn is keyed to the shaft 24. By this arrangement the ratchet-wheel 54 is constantly rotated during the advance of the machine. It is to be understood that the binder-needle and the discharge-arm are operated only at certain intervals, and this continuous motion of the ratchet-wheel 54 is made to operate these parts at intervals by means of the following-described mechanism:

The reference-numeral 57 indicates a shaft rotatably mounted in bearings located at the outer side of the guide 20. On the upper end of the shaft 57 is a supporting-arm 58 to extend across the shock-forming platform.

59 indicates an arm fixed to the lower end of the shaft 57 and extended rearwardly.

The reference-numeral 60 indicates an expansive spring forming part of a spring-link pivoted at one end to the arm 59 and at the other end to a trip-lever 61. This lever 61 is pivoted near its one end to a curved lever 62. The movement of these levers relative to each other is limited by the projection 63, formed on the lever 62.

64 indicates an extensile spring interposed between the levers 61 and 62 to normally hold the forward end of the trip-lever 61 toward the other lever. The opposite end of the lever 62 is pivoted to a part of the lower track, and a roller 65 is fixed to the lever 62 to enter a cam-groove 66, formed on the under surface of the sprocket-wheel 50. This cam-shaped groove is so arranged and disposed relative to the lever and roller that when the sprocket-wheel has nearly performed a revolution the lever 62 will be moved laterally in a direction that will permit the arm 58 to move rearwardly to allow the discharge of the shock, and then immediately return said arm, so that it may again engage the stalks being passed to the shock-forming platform and also bring the lever 61 toward the sprocket-wheel 50.

The numeral 67 indicates a spring-actuated pawl pivoted to the top surface of the sprocket-wheel 50 to be normally held in engagement with the ratchet-wheel 54 by means of its spring 68. One end of this pawl projects outwardly from the sprocket-wheel 50 far enough to engage the end of the lever 61, and when in engagement therewith the pawl 67 is obviously held out of engagement with the ratchet-wheel 54. In practical use when the pressure of stalks upon the supporting-arm 58 becomes great enough the lever 61 will be withdrawn from engagement with the pawl 67. As soon as this occurs the spring 68 will throw the pawl 67 into engagement with the ratchet-wheel 54. This ratchet-wheel 54, as hereinbefore described, is constantly rotated during the advance of the machine. Hence the sprocket-wheel 50 will be carried around with it. This motion will continue until the wheel 50 has performed a complete revolution, whereupon the pawl 67 will engage the lever 61. This will throw the pawl out of engagement with the ratchet-wheel 54 and hence stop the movement of the wheel 50. It will be understood that a rotation of the wheel 50 through a complete circle will operate the discharge-arm at its top to force a shock from the shock-forming platform and to again return to its normal position.

69 indicates a leaf-spring fixed to a support beneath the lower track to engage the arm 72 when said arm is at the rearward limit of its stroke—that is, in its position of rest. This spring will exert a yielding pressure upon the said arm and thereby hold the wheel 50 in such a position as to force the outer end of the pawl 67 into engagement with the lever 61, and the said spring is strong enough to compress the spring 68, so that the said pawl 67 is held out of contact with its ratchet-wheel 54. The parts are illustrated in this position in Fig. 3 of the drawings.

The means for operating the needle-arm in connection with the operation of the discharge-arm comprises a sprocket-chain 70, arranged to engage a portion of the sprocket-wheel 50. This chain is supported in position upon the idlers 71, which serve to hold it in place and which are rotatably mounted upon the portions of the under track to the extension thereof.

The numeral 72 indicates an arm fixed to the lower end of the shaft 46 and extended forwardly therefrom.

73 indicates a link pivoted to the arm 72 and also to one of the links of the sprocket-chain 70, it being arranged in a lower plane than the said sprocket-chain. It is obvious that a complete rotation of the sprocket-chain 70 will move the arm 72 in the segment of a circle, and this movement will operate the binding-needle to pass across the shock-forming platform and then be returned to its normal position.

It is desirable to move the slide 38 in the upper track as soon as the binding-needle has started to move, so that the stalks of corn will not be fed to the shock-forming platform during the operation of the binding-needle. This slide is operated by means of a curved lever 80, pivoted at one end to a support 81, which is formed on the lower track and which is provided with a slot 82 in its top surface. This slot is concentric with the shaft 46 for a portion of its length, and near its pivotal point it is curved outwardly from the shaft 46.

83 indicates a roller rotatably mounted on the end of the arm 72 to enter the groove 82. A rod 84 is pivoted to the end of the lever 80 and also to a lever 85, which is fulcrumed to a support 86, formed on the lower track-section and which projects upwardly to a point near the upper track.

87 indicates a pitman pivoted to the lever 85 and also to the slide 38. In practical use the normal position of the slide 38 is at its rearward limit. The lever 80 and the roller 83 are so arranged that as soon as the sprocket-wheel 50 begins its rotation the lever 80 will be moved forwardly by reason of the roller 83 entering that portion of the groove 82 that inclines outwardly from the shaft 46. This obviously will move the free end of the lever 80 forwardly, and the slide 38 will be thereby moved forwardly, thus causing the links of the conveyer to kink or fold at a point in advance of their usual position for kinking or folding. As the motion of the wheel 50 continues the lever 80 will again be returned to its normal position, and the slide will not be moved during that portion of the movement of the wheel 50 during which the roller 83 remains in the concentric portion of the groove 82.

I so arrange and combine the parts just described that when the wheel 50 is set in motion the slide 38 will first move forwardly. Then the binding-needle will move across the shock-forming platform, and after that the discharge-arm will engage the shock and discharge it before the movement ceases.

I shall next describe the construction and operation of the binding mechanism.

The reference-numeral 90 is used to indicate a cam-shaped guide arranged to be adjustably secured by means of the bolts 91 to the under surface of the upper track. The cam-surface of the guide 90 is composed of three segments, each arranged concentrically with the shaft 46 and each arranged at a different distance from the shaft.

The reference-numeral 92 indicates a lever pivoted to the arm 47 and having its free end inserted in a slot formed in the needle 48.

93 indicates a roller pivotally mounted on said lever and arranged to engage with the cam-surface of the guide 90.

94 indicates a stop fixed to a portion of the upper track to engage with the lever 92 when the binding-needle is at the outer limit of its movement.

95 indicates a segmental rack slidingly mounted within the binding-needle 48, and 96 indicates a pitman connecting the free end of the lever 92 with the said rack 95. As will be hereinafter made clear, this rack is for the purpose of actuating the knotting device. It is necessary in the operation of this knotter that the knotting device be rotated first somewhat more than a revolution in a forward direction and then be rotated backward a part of a revolution. This mechanism just described is arranged to operate the shaft on which the knotter is mounted at the proper time to perform the act of tying the knot. In Fig. 8 the binding-needle is shown to be in its position at rest, and it will be noted that the lever 92 is at its outer limit relative to the needle and that the fingers of the knotter are in a position pointing backwardly, so that when the needle passes close to the shock of corn said fingers will not engage the stalks and become entangled therein. The needle moves forwardly in this position until the lever 92 engages the stop 94, whereupon the lever 92 is moved to its rearward limit, as shown in dotted lines. This movement will cause the shaft on which the knotter is mounted to rotate slightly more than one and one-half revolutions—that is, sufficient to engage the twine and to form a loop upon the fingers and to bring the fingers to such a point that they will open and grasp the twine beyond the loop, and when in this position the fingers will point toward the point of the needle and also upwardly. It is then necessary that as soon as the needle is moved backwardly a slight distance the fingers of the knotter shall be moved to a position inclined downwardly and toward the point of the needle to thereby release the fingers from the twine. This slight revolution of the knotter is caused by the engagement of roller 93 with the first shoulder 97 of the cam 90.

Referring to Fig. 8 of the accompanying drawings, it will be noted that in dotted lines the roller 93 is shown in engagement with a surface of the cam-guide 90 that is concentric with but of less diameter than the surface with which said roller contacts, as shown in solid lines, and inasmuch as the arm 92 is pivoted at one end to the arm 47, which is pivoted concentrically with the guide 90, and the roller 93 is fixed in its position on the arm 92, the said arm 92 must obviously be pivoted to the arm 47 eccentrically relative to the cam 90 in order to permit the roller 93 to assume a position farther from the pivot of the arm 47 as it approaches the rear end of its stroke. The rack 95 is connected with the arm 92, and in practical operation and assuming that the arm 47 moved from the position shown in dotted lines to the position shown in solid lines the roller 93 would travel on the cam-surface until it engaged the shoulder 97. Then obviously the arm 92 would be held stationary while the needle continued to move backwardly. This would of course move the rack 95 relative to the pinion 102, which would turn the knotter 110. It is obvious that the roller 93 will be held at said shoulder until the needle has been drawn backwardly to such an extent that the roller may pass to the second segment of the cam. In this position the fingers of the knotter may be drawn backwardly in such a position that they will not engage any protruding cornstalks from the shock. Then as the needle further recedes the roller 93 will engage the second shoulder of the cam 90, and this will hold the roller for a short time or until the rack 95 has been moved to its forward limit within the needle and the fingers of the knotter are again pointing in their original position.

The reference-numeral 100 indicates a shaft rotatably mounted in a suitable bearing 101 within the needle.

102 indicates a cog-wheel fixed to the shaft 100 and engaged by the rack 95. This rack 95 is supported in the bearing 103 and is capable of a limited upward movement. It is, however, normally held downwardly in engagement with the cog-wheel 102 by means of a leaf-spring 104. This spring is fixed to the top of the interior of the needle and has a lug 105 thereon. In the top of the rack 95 are two notches 106, arranged at the limits of the movement of the rack 95 relative to the needle. By this means the rack 95 is stopped or held when it has reached each limit of its movement.

107 indicates a disk supported within the needle and around the shaft 100 and having thereon a cam 108.

109 indicates a disk having formed thereon to project outwardly therefrom a curved finger 110, having a groove 111 on its inner surface.

112 indicates a movable finger pivoted in the bearings 113, formed on the finger 110.

114 indicates a spring fixed to the inner face of the disk 109 to engage the inner end of the finger 112 to normally hold the outer end of the movable finger in engagement with the fixed finger. The said outer end of this movable finger is provided with a shoulder 115, as is usual in knotting devices of this class. I have previously described how the shaft 100 receives its motion, and by this motion the knotter-fingers are first made to engage and twist the cord upon the two fingers, forming a loop thereon. Then the end of the movable finger 112 is brought into engagement with the cam 108, and the outer ends of the fingers are separated to grasp the cord beyond the loop formed on the fingers. It will then immediately pass over the cam 108, and the fingers will be tightly closed to grasp the cord by means of the spring 114. When this has been done, the fingers are rotated in a direction to turn them backwardly. This causes the loop of twine to slip from the ends of the fingers, except the ends which have been grasped between the fingers. A further pull upon these ends will cause the knot to be tied tightly.

I shall next describe the mechanism for holding the end of the twine and for supporting the twine in position where it may be engaged by the knotting-fingers.

The reference-numeral 116 indicates a plate supported upon uprights fixed to the lower track and having therein an opening 117, through which the needle may pass, and a slot 118, through which the twine carried by the needle may pass.

119 indicates a support fixed to the outer surface of the plate 116 and having an arm 120 pivoted to its outer end. On the free end of this arm 120 is a hook 121, and the said arm is so shaped that when the cord is passed through the slot 118 and engaged by the hook 121 the fingers of the knotting device may easily engage it.

122 indicates an extensile spring arranged to normally force the arm 120 outwardly.

123 indicates a lug formed on or fixed to the outer surface of the arm 120 in position to be engaged by the inclined edge 124 at the end of the binding-needle. When engaged by this incline 124, the arm 120 is forced inwardly, so that the hook 121 on its end will not remain in the path of the fingers of the knotter, and as soon as the binding-needle retreats the arm 120 is turned outwardly by its spring 122, and the hook 121 again engages the twine and holds it in position, so that the fingers of the knotter may engage upon its return movement.

125 indicates a rim fixed to a suitable support on the outer surface of the plate 116, arranged in position so that the binder-needle will pass through it when at the outer limit of its stroke. Two teeth 126 are formed on the interior surface of this rim to project inwardly therefrom.

127 indicates a rim rotatably mounted within the rim 125 and having a series of teeth formed on its axial surface. These teeth are provided with beveled edges 128.

129 indicates a support fixed to the rim 125 to project upwardly therefrom.

130 indicates a lever pivoted thereto to extend downwardly with its lower edge in frictional engagement with the outer surface of the rim 127.

131 indicates a bolt extended through the lever 130 and the rim 125 and having an extensile spring 132 on its opposite end to engage the rear surface of the rim 125 and also a nut 133 on the end of the bolt. By this arrangement the lever 130 is forced into engagement with the rim 127.

134 indicates a knife fixed to the lower end of the lever 130. In practical operation this device, which is for the purpose of holding the ends of the twine and for severing the twine when the knot has been tied, is used as follows: It will be understood that the twine is carried in a suitable holder 135, located on the machine-frame, and that the twine is passed therefrom through the binding-needle and through a hole 136 in the end of the binding-needle. When the binder-needle has been passed through the rims 125 and 127, the twine carried thereby will be forced between two of the teeth 128. Thereupon the rim 127 is rotated one tooth's space, and the twine is thereby grasped between one of the teeth 128 and one of the teeth 126, as shown in Fig. 16. The means for moving this rim 127 one tooth's space is illustrated in Fig. 12 and consists of a pointed bar 137, pivoted to the under surface of the needle and engaged by a spring 138, which normally holds it to one limit of its movement. The stop 139, fixed to the needle, limits the movement of the bar 137 in an opposite direction. When the needle passes through the rims 125 and 127, the said bar 137 engages the beveled edge 128 of the lower tooth of the rim 127. This will advance the rim 127 one tooth's space. Then as the binding-needle is withdrawn the bar 137 is moved against the pressure of its spring 138, so that it will not move the rim 127 backwardly. It will now be seen that one end of the cord is retained within the holder. As the needle recedes the cord will be played out from the needle, and as the shock of corn is brought upon the shock-forming platform it will be encircled by the twine. After the shock is formed the needle will be moved across the shock-forming platform and the twine will be carried around the opposite side of the bundle to encircle the bundle, and as the needle is again passed through the rims 125 and 127 the other end of the cord will be engaged by the teeth 126 and 128 in the same manner as hereinbefore described. Then after the knotting mechanism is operated the two parts of the twine will be tied and made to engage the knife 134 and be severed thereby. Thus both ends of the twine are severed each time that the movable rim is advanced one tooth's space, and the end that is attached to the needle is held between the teeth, while the remaining end may drop out, because it passes above the upper tooth on the stationary rim.

In practical operation the method whereby the shock may be bound horizontally while the end of the shock is standing on an incline may be described as follows: The conveyer-fingers grasp the corn in a vertical position and carry it to the rear end of the passage-way, where the binding takes place. During the time that the shock is being formed the conveyer-arms on the upper and lower platforms are withdrawn at points in the same vertical plane. Then when the slide in the upper track is moved forwardly the upper ends of the stalks will be stopped and held at an incline while the butt-ends of the stalks are passed to the shock-forming platform. When the binding-needle is moved rearwardly after tying a shock, the twine is of course stretched across the passage-way. Then as the slide in the upper track is moved rearwardly the tops of the stalks will be swung back and the butt-ends held stationary. The twine will engage the rear side of the shock and be carried backwardly therewith. It is obvious that when the twine is carried around the opposite side of the shock by the needle it will be in the same horizontal plane, although the needle moves in a divergent plane.

It is obvious that by reason of the means for withdrawing the fingers in the upper conveyers and for changing the point at which the fingers are withdrawn the use of any kind of auxiliary packers or carrying devices is dispensed with.

Having thus described the construction, arrangement, and function of each part relative to the other parts, it is believed that the operation of the entire machine will be readily understood.

What I claim as my invention is—

1. In a corn-harvester, the combination with means for severing cornstalks, of a continuous hollow track, a flange projecting laterally from one side of the track, an upturned edge on the flange, a second like track above the first in a parallel plane, a guide-rail supported on the machine-frame directly above the upturned edge of the lower flange, and an endless conveyer in each of said tracks, laterally-projecting arms on the conveyer to extend through the tracks and in proximity to said flange and rail, and means for driving the conveyer by means of power derived from the traction-wheels of the machine.

2. In a corn-harvester, the combination with means for severing cornstalks, of a lower hollow track having a laterally-widened portion therein near its rear end, a flange projecting laterally from one side of the hollow track, an upturned edge on the flange, a second hollow track above the first, also having a widened portion therein near its rear end, a guide-rail supported adjacent to the upper track and directly above the upturned edge of the lower track, a conveyer-chain in each track of a length greater than the distance around the track, so that they must kink or fold at one point, laterally-projecting arms on the chain to project outwardly through the track into proximity to the said upturned edge and the said rail, and means for driving both chains by power derived from the traction-wheels of the device, substantially as and for the purposes stated.

3. In a corn-harvester or the like, the combination of a continuous hollow track, an inwardly-inclined portion 34 near the rear end of the track, a curved portion 35 at one end of the inclined portion 34, an endless conveyer within the track of a length greater than the distance around the track, and composed of a series of links, rollers at the ends of the links to approximately fill the narrow portion of the track, and a laterally-projecting arm on each alternate link to project outwardly through the outer edge of the narrow portion of the track, substantially as and for the purposes stated.

4. In a corn-harvester or the like, the combination of a continuous hollow track, an inwardly-inclined portion 34 near the rear end of the track, a curved portion 35 at one end of the inclined portion 34, an endless conveyer within the track of a length greater than the distance around the track, and composed of a series of links, rollers at the ends of the links to approximately fill the narrow portion of the track, and a laterally-projecting arm on each alternate link to project outwardly through the outer edge of the narrow portion of the track, and a stop $37^a$ fixed to the base of the interior of the track at a point adjacent to the incline 34.

5. In a corn-harvester, the combination with means for severing cornstalks, of a conveyer designed to carry the stalks to the rear of the machine in an upright position, and composed of two hollow tracks one above the other, each having a widened portion near its rear end, stationary guides supported in the machine-frame in substantially the same planes as the tracks, a platform adjacent to the lower track to receive stalks from the cutting mechanism, a conveyer-chain in each track of a length greater than the distance around the track, and composed of a series of links, rollers in the ends of the links to approximately fill the narrow portions of the tracks, a laterally-projecting arm on each alternate link of the conveyers, a shaft rotatably mounted to extend through the spaces within the hollow tracks, a wheel on its lower end bowed upwardly in its central portion and having its lower edge admitted into one side of the lower track and provided with pockets designed to engage the rollers of the conveyer, a bevel gear-wheel fixed to the lower end of the said shaft within the said wheel, a second bevel gear-wheel meshed therewith and fixed to the axle of the traction-wheels, and a wheel fixed to the upper end of the said shaft and provided with pockets on its edge designed to engage the rollers on the upper conveyer, all arranged and combined substantially in the manner set forth and for the purposes stated.

6. In a corn-harvester, the combination with a hollow continuous track, and an endless conveyer-chain arranged for constant rotation therein during the advance of the machine, of a wheel rotatably mounted within the forward turn of the track, a series of pockets formed on the top surface of the said wheel to engage the endless conveyer and to be rotated thereby, a series of curved knife-blades fixed to the under surface of the said wheel to project beyond the track, and a stationary knife-blade fixed to the track to coact with the rotatable blades, substantially in the manner set forth and for the purposes stated.

7. In a corn harvester and binder or the like, a device for imparting motion to a binding-needle and a discharge-arm when a shock of corn has been gathered on the machine-platform, comprising an upright shaft rotatably mounted, a binding-needle fixed to its upper end, an arm fixed to its lower end, a sleeve rotatably mounted on the shaft, a discharge-arm fixed to the upper end of the sleeve, a disk fixed to the lower end of the sleeve and having a cam-groove therein, a second sleeve rotatably mounted upon the first, means for rotating this second sleeve during the advance of the machine, a ratchet-wheel fixed to the lower end of the said sleeve, a spring-actuated pawl fixed to the upper surface of the said disk to be normally held by its spring in engagement with the said ratchet-wheel, a lever pivoted to a stationary support, a roller pivoted to the lever and inserted in the said cam-groove, a second lever pivoted to the first and arranged for engagement with the end of the said spring-actuated pawl, a spring connecting the said levers and arranged to hold the pawl-engaging lever in engagement with its pawl, means for moving the arm on the binding-needle shaft in the segment of a circle and then returning it upon each revolution of the said disk, a yielding pressure device fixed to a stationary support to engage the arm of the binding-needle when at rest to thereby hold the said disk in such a manner as to overcome the force of the spring belonging to the said spring-actuating pawl and to thereby hold the spring-actuated pawl out of engagement with its ratchet, a supporting-shaft rotatably mounted, a stalk-supporting arm fixed to its upper end, an arm fixed to its lower, and a spring fixed to the said arm and also to the pawl-engaging lever, all arranged and combined substantially in the manner set forth and for the purposes stated.

8. In a corn harvester and binder or the like, a device for imparting motion to a binding-needle and a discharge-arm when a shock of corn has been gathered on the machine-platform, comprising an upright shaft rotatably mounted, a binding-needle fixed to its upper end, an arm fixed to its lower end, a sleeve rotatably mounted on the shaft, a discharge-arm fixed to the upper end of the sleeve, a disk fixed to the lower end of the sleeve and having a cam-groove therein, a second sleeve rotatably mounted upon the first, means for rotating this second sleeve during the advance of the machine, a ratchet-wheel fixed to the lower end of the said sleeve, a spring-actuated pawl fixed to the upper surface of the said disk to be normally held by its spring in engagement with the said ratchet-wheel, a lever pivoted to a stationary support, a roller pivoted to the lever and inserted in the said cam-groove, a second lever pivoted to the first and arranged for engagement with the end of the said spring-actuated pawl, a spring connecting the said levers and arranged to hold the pawl-engaging lever in engagement with its pawl, sprocket-teeth on the periphery of the said disk, two idlers located adjacent to the said sprocket-teeth, a sprocket-wheel mounted on the said idlers to engage the said sprocket-teeth, and a link pivoted to the said sprocket-chain and also to the arm on the binding-needle shaft, a yielding pressure device fixed to a stationary support to engage the arm of the binding-needle when at rest, to thereby hold the said disk in such a manner as to overcome the force of the spring belonging to the said spring-actuating pawl, and thereby hold the spring-actuated pawl out of engagement with its ratchet, a supporting-shaft rotatably mounted, a stalk-supporting arm fixed to its upper end, an arm fixed to its lower end, and a spring fixed to the said arm and also to the pawl-engaging lever, all arranged and combined substantially in the manner set forth and for the purposes stated.

9. In a corn harvester or binder or the like, a device for imparting motion to a binding-needle and a discharge-arm when a shock of corn has been gathered on the machine-platform, comprising an upright shaft rotatably mounted, a binding-needle fixed to its upper end, an arm fixed to its lower end, a sleeve rotatably mounted on the shaft, a discharge-arm fixed to the upper end of the sleeve, a disk fixed to the lower end of the sleeve and having a cam-groove therein, a second sleeve rotatably mounted upon the first, means for rotating this second sleeve during the advance of the machine, a ratchet-wheel fixed to the lower end of the said sleeve, a spring-actuated pawl fixed to the upper surface of the said disk to be normally held by its spring in engagement with the said ratchet-wheel, a lever pivoted to a stationary support, a roller pivoted to the lever and inserted in the said cam-groove, a second lever pivoted to the first and arranged for engagement with the end of the said spring-actuated pawl, a spring connecting the said levers and arranged to hold the pawl-engaging lever in engagement with its pawl, sprocket-teeth on the periphery of the said disk, two idlers located adjacent to the said sprocket-teeth, a sprocket-wheel mounted on the said idlers to engage the said sprocket-teeth, and a link pivoted to the said sprocket-chain and also to the arm on the binding-needle shaft, a lever fulcrumed to a stationary support and curved first in the direction of the shaft of the binding-needle and then concentric with the binding-needle, a groove in the top surface of the said lever, a roller on the end of the arm of the binding-needle shaft to enter said groove, and a rod pivoted to the outer end of the lever arranged to actuate a slide, a yielding pressure device fixed to a stationary support to engage the arm of the binding-needle when at rest, to thereby hold the said disk in such a manner as to overcome the force of the spring belonging to the said spring-actuating pawl, and to thereby hold the spring-actuated pawl out of engagement with its ratchet, a supporting-shaft rotatably mounted, a stalk-supporting arm fixed to its upper end, an arm fixed to its lower end, and a spring fixed to the said arm and also to the pawl-engaging lever, all arranged and combined substantially in the manner set forth and for the purpose stated.

10. In a grain-binder, the combination of a shaft rotatably mounted, a binding-needle fixed to its upper end, an arm fixed to its lower end, a sprocket-wheel loosely mounted on its lower end, means arranged to be set in motion by the pressure of a shock of corn upon the binding-needle whereby the said sprocket-wheel will be clutched to a constantly-rotating part, two idlers mounted adjacent to the sprocket-wheel, a sprocket-chain passed around the idlers to engage a segment of the said sprocket-wheel, and a link pivoted to a part of the said sprocket-chain and also to the arm on the lower end of the needle-shaft, substantially in the manner set forth and for the purpose stated.

11. In a grain-binder, the combination of a shaft rotatably mounted, a binding-needle fixed to its upper end, an arm fixed to its lower end, a sprocket-wheel loosely mounted on its lower end, means arranged to be set in motion by the pressure of a shock of corn on the binding-needle whereby the said sprocket-wheel may be clutched to a constantly-rotating part, and means for rotating the said sprocket-wheel one revolution, and two idlers mounted adjacent to the sprocket-wheel, a sprocket-chain passed around the idlers to engage a segment of the said sprocket-wheel, and a link pivoted to a part of the said sprocket-chain and also to the arm on the lower end of the needle-shaft, a lever pivoted to a stationary support and extended first in the direction of the shaft of the binding-needle, and then in a direction concentric with the shaft, a groove in its top surface, a roller on the outer end of the arm on the binding-needle shaft to enter said groove, and a rod pivoted to the outer end of the said lever for actuating a slide, substantially as and for the purposes stated.

12. In a corn-binder, the combination of a binder-needle, means for moving it across the binding-platform and then returning it, a shaft rotatably mounted within the needle, a disk on the shaft within the needle, a fixed finger on the disk to project beyond the side of the needle, a movable finger pivoted to the fixed finger, a pinion on the shaft, a rack slidingly mounted within the needle and in mesh with the pinion, a pitman connected with the rack, a lever pivoted to the pitman, and means whereby said lever is moved relative to the needle to thereby rotate the shaft on which the knotter-fingers are fixed.

13. In a corn-binder, the combination of a binder-needle, means for moving it across the binding-platform and then returning it, a shaft within the needle, a knotter on the shaft to project through the side of the needle, a pinion connected with the said knotter, a rack slidingly mounted with the needle and in mesh with the pinion, a pitman connected with the rack, a lever pivoted to the arm of the binder-needle and extended through a slot in the needle proper, and having its free end connected with the said pitman, a roller on said lever a stop fixed to a stationary support arranged to engage the said lever when the binder-needle approaches the outer limit of its movement, to thereby force the lever rearwardly within the needle, and a cam-guide fixed to a stationary support, substantially segmental in shape, and having on its cam-surface a part concentric with the said shaft, an outwardly-inclined shoulder, a second concentric part flush with the said shoulder, a second like shoulder, and a third concentrically-arranged segment beyond it, said cam being designed to be engaged by the said roller to control the movement of the lever relative to the needle, substantially as and for the purposes stated.

14. In a corn-binder, the combination of a binder-needle, means for moving it across the binding-platform and then returning it, a shaft rotatably mounted within the needle, a disk on the shaft within the needle, a fixed finger on the disk to project beyond the side of the needle, a movable finger pivoted to the fixed finger, a pinion on the shaft, a rack slidingly mounted within the needle and in mesh with the pinion, having two notches in its upper surfaces separated by the distance of its length of movement, a leaf-spring fixed to the inner surface of the needle, and having a lug thereon to engage said notches to aid in limiting the movement of the rack, a pitman connected with the rack, a lever pivoted to the pitman, and means whereby said lever is moved relative to the needle to thereby rotate the shaft on which the knotter-fingers are fixed.

15. In a binding device the combination with a needle arranged to carry the twine and to be moved in the segment of a circle, of a knotting device carried by the needle to project from one side thereof, a plate fixed to the machine-frame, and having an opening therein through which the needle must pass, and also having a slot connected with the opening through which the twine may pass, an automatic twine-holder located adjacent to the needle when the needle is at the outward limit of its stroke to hold the twine, an arm pivoted to a stationary support, and having a hook on its end, a lug on the said arm arranged in the path of the end of the needle and so positioned that the needle will move the said arm laterally as it nears the end of its outer movement, and a spring for normally returning the arm, substantially as and for the purposes stated.

16. In a binding device, the combination with a binding-needle arranged to move in the segment of a circle, and also arranged to carry the binding-twine, of a rim fixed to a stationary support in position where the end of the binding-needle will pass through it when at the outer limit of its movement, two teeth on the axial surface of the said rim, a second rim rotatably mounted within the first, and having teeth on its axial surface, the said teeth on the rims being so arranged and disposed that the twine carried by the needle will enter the interdental spaces of the rims, and a device carried by the needle for moving the rotatable rim one tooth's space, to thereby clamp the twine between the teeth on the two rims, for the purposes stated.

17. In a binding device, the combination with a binding-needle arranged to move in the segment of a circle, and also arranged to carry the binding-twine, of a rim fixed to a stationary support in position where the end of the binding-needle will pass through it when at the outer limit of its movement, two teeth on the axial surface of the said rim, a second rim rotatably mounted within the first, and having teeth on its axial surface, the said teeth on the rims being so arranged and disposed that the twine carried by the needle will enter the interdental spaces of the rims, and a device carried by the needle for moving the rotatable rim one tooth's space, to thereby clamp the twine between the teeth on the two rims, an arm fixed to the stationary rim, a lever pivoted to the said arm to engage the rotatable rim, a yielding pressure device for holding the lever in engagement with the rotatable rim, and a knife fixed to the lower end of the said lever, substantially as and for the purposes stated.

18. In a binding device, the combination with a needle arranged for carrying the twine and for movement in the segment of a circle, of a stationary rim through which the end of the needle must pass, two or more teeth on the axial surface of the rim, a second rim rotatably mounted on the first, a series of teeth on the axial surface of the second rim having beveled edges, a yielding pressure device for holding the rotatable rim against the movable rim, a knife on the said yielding pressure device, and a bar having a pointed end pivoted to the under surface of the needle, a stop fixed to the under surface of the needle to limit the movement of the said bar, and a spring also fixed to the needle to engage the opposite end of the bar, all arranged and combined to operate in the manner set forth and for the purposes stated.

19. In a binding device, the combination of a binding-needle, twine carried by the needle and passed through an opening in the end thereof, a knotter carried by the needle, a rim having fixed teeth on its axial surface and in position to receive the twine carried by the needle when the needle is at the outward limit of its stroke, a second rim rotatably mounted with the first, teeth on its axial surface, a device carried by the needle for rotating the movable rim upon the passage of the needle through the rims, to thereby grasp the twine between the teeth on the rims, for the purposes stated.

20. A binding device, comprising a binding-needle arranged for movement in the segment of a circle, twine passed through the needle and through an opening in the outer end thereof, a knotter carried by the needle to project beyond one of its sides, a plate having an opening therein through which the needle must pass, and a slot connected with the opening through which the twine must pass, an arm pivotally mounted, and having a hook on its outer end designed to engage and support the twine in position so that the knotting device of the needle may engage the twine as the needle passes through the opening in the said plate, a lug on the said pivoted arm whereby the arm is pressed laterally so that the knotting device will not contact therewith when the needle has continued its movement and is at the outward limit of its stroke, a device for actuating the twine-engaging device carried by the needle, a twine-holder fixed to a stationary support and a twine-cutter located on the twine-holder, substantially as and for the purposes stated.

21. In a corn-harvester, the combination of an endless-conveyer track 13, having vertical side pieces, and a slot in the outer one of the said side pieces, and also having at its rear end a widened portion, an inclined portion 34, and rounded portion 35 on the inner side piece of the track, and a series of links 31, having rollers 32, and the arms 33 on each alternate link, all arranged and combined substantially in the manner set forth and for the purposes stated.

22. In a corn harvester and binder, the combination of a binder-platform to extend rearwardly and upwardly and designed to support the butts of the stalks when the shock is being bound, two conveyer-tracks arranged one above the other above said platform, endless conveyers in said tracks, laterally-projecting fingers on said conveyers, means for operating the conveyers, means for withdrawing the conveyer-fingers into the tracks at points in the same vertical plane, and means for confining the cornstalks laterally at the side opposite from the tracks.

23. In a corn harvester and binder, the combination of a binder-platform to extend rearwardly and upwardly and designed to support the butts of the stalks when the shock is being bound, two conveyer-tracks arranged one above the other and above said platform, endless conveyers in said tracks, laterally-projecting fingers on said conveyers, means for operating the conveyers, means for withdrawing the conveyer-fingers into the tracks at points in the same vertical plane, means for confining the cornstalks laterally at the side opposite from the tracks and means for causing the conveyer-fingers in the upper track to be withdrawn at certain intervals at a point in advance of their usual withdrawal position.

24. In a corn harvester and binder, the combination of a binder-platform to extend rearwardly and upwardly and designed to support the butts of the stalks when the shock is being bound, two conveyer-tracks arranged one above the other and above the said platform, endless conveyers in said tracks, laterally-projecting fingers on said conveyers, means for operating the conveyers, means for withdrawing the conveyer-fingers into the tracks at points in the same vertical plane, means for confining the cornstalks laterally at the side opposite from the tracks, and means for causing the conveyer-fingers in the upper track to be withdrawn at certain intervals at a point in advance of their usual withdrawal position, and a binding-needle arranged for movement in the same plane as the tracks, and means for causing the said fingers in the upper track to be withdrawn at their forward point of withdrawal during that period of time when the binding-needle is moving across the passage, and to withdraw at their rearward limit, that is, directly above the withdrawal point of the fingers on the lower track, at all other times.

25. In a corn harvester and binder, the combination of a binder-platform inclined from its forward end upwardly and designed to support the butts of the stalks when the shock is being bound, means for severing cornstalks and for placing their butt-ends thereon, means for conveying the cornstalks in a vertical position to the rear end of the platform, a binder-needle arranged for movement in the same plane as the platform, and mechanism for holding the tops only of the incoming stalks from passing to their rearward limit during that period of time when the binding-needle is being moved across the platform, and for again moving the tops of the said stalks rearwardly to a vertical position after the binder-needle has withdrawn, for the purposes stated.

26. In a corn-harvester, the combination of a hollow conveyer-track having no bottom at its forward turn, an endless conveyer therein means for driving the conveyer by power derived from the traction-wheels of the machine, a wheel loosely mounted in the forward turn of said track, a circular flange on the lower edge of the wheel, and a series of pockets on its top, said flange and pockets being designed to support the conveyer-chain, stationary cutters fixed to the track, and rotary cutters fixed to the said flange, substantially in the manner set forth and for the purposes stated.

27. In a corn-harvester, a stalk-cutter, comprising in combination a sharp-edged knife fixed to the machine-frame with its cutting edge diverging at an acute angle from a fore-and-aft line through the machine and in position to engage and cut cornstalks during the advance of the machine, and a rotary knife with its cutting edge inclined forwardly with relation to its direction of rotation, and forming with the fixed knife, and during its effective stroke, a narrow V-shaped opening with its apex forward and the angle of which constantly decreases, for the purposes stated.

28. A stalk-cutter for harvesters, &c., comprising a sharp-edged knife fixed to the machine-frame at an acute angle relative to the line of advance with its cutting edge forward and in position to engage and sever stalks with a drawing cut during the advance of the machine, in combination with a rotary knife mounted adjacent to the fixed one and inclined forwardly with relation to its line of rotation said incline being of such a degree that the cutting edge of the knife will during its rotation engage a standing stalk and slide relative thereto from its point toward its base, and said rotary knife being so positioned with relation to the fixed one as to form between the cutting edges thereof a narrow V-shaped opening with its apex forward, for the purposes stated.

29. A stalk-cutter for harvesters, &c., comprising a sharp-edged knife 43, fixed to the machine-frame at an acute angle relative to the line of advance with its cutting edge forward and in position to engage and sever stalks with a drawing cut during the advance of the machine and an auxiliary fixed blade 44 leading from the rear end of the blade 43 forwardly and away from the fixed blade 43 with its cutting edge on the side toward the blade 43, in combination with a rotary knife inclined forwardly in relation to its line of rotation said incline being of such a degree that the cutting edge of the knife will during its rotation engage a standing stalk and slide relatively thereto from its point toward its base, and said rotary knife being of such a length that its point will overlap the rear end portion of the auxiliary fixed knife 44, said rotary knife also being so positioned with relation to the fixed one as to form between the cutting edges of the rotary knife and the knife 43 a narrow V-shaped opening with its apex forward, for the purposes stated.

WILLIAM HENRY GRAY.

Witnesses:
A. W. FOIS,
JAMES A. GRAY.